United States Patent
Pan et al.

(10) Patent No.: US 11,264,794 B2
(45) Date of Patent: Mar. 1, 2022

(54) SERIES COMPENSATOR AND CONTROL METHOD

(71) Applicants: NR ELECTRIC CO., LTD, Nanjing (CN); NR ENGINEERING CO., LTD, Nanjing (CN)

(72) Inventors: Lei Pan, Nanjing (CN); Jie Tian, Nanjing (CN); Dongming Cao, Nanjing (CN); Yunlong Dong, Nanjing (CN); Qiwen Zhou, Nanjing (CN); Ruhai Huang, Nanjing (CN); Fengfeng Ding, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 0 days.

(21) Appl. No.: 16/649,113

(22) PCT Filed: Sep. 11, 2018

(86) PCT No.: PCT/CN2018/104949
§ 371 (c)(1),
(2) Date: Mar. 19, 2020

(87) PCT Pub. No.: WO2019/119886
PCT Pub. Date: Jun. 27, 2019

(65) Prior Publication Data
US 2020/0295561 A1  Sep. 17, 2020

(30) Foreign Application Priority Data

Dec. 20, 2017 (CN) .......................... 201711381798.9

(51) Int. Cl.
*H02H 9/02* (2006.01)
*H02H 7/125* (2006.01)
(Continued)

(52) U.S. Cl.
CPC ................ *H02H 9/02* (2013.01); *G05B 15/02* (2013.01); *H01H 71/24* (2013.01); *H02H 7/125* (2013.01);
(Continued)

(58) Field of Classification Search
CPC .......... H02H 7/125; H02H 9/02; G05B 15/02; H02J 13/00; H02J 3/00; H01H 79/00;
(Continued)

(56) References Cited

U.S. PATENT DOCUMENTS 5,617,012 A * 4/1997 Murakami ............... H02H 7/12
 323/207
5,734,256 A * 3/1998 Larsen .................. H02J 3/1814
 323/207

(Continued)

FOREIGN PATENT DOCUMENTS

| CN | 107947173 | 4/2018 |
|---|---|---|
| CN | 207612063 | 7/2018 |

OTHER PUBLICATIONS

International search report dated Nov. 29, 2018 from corresponding application No. PCT/CN2018/104949.

(Continued)

*Primary Examiner* — Danny Nguyen
(74) *Attorney, Agent, or Firm* — Hauptman Ham, LLP

(57) ABSTRACT

The present invention provides a series compensator and a control method. The series compensator includes a series transformer, a series transformer bypass device, a voltage source converter, a high-speed converter bypass device, a high-speed switch, and a reactor. The reactor and the high-speed switch are connected in parallel to form a current limiting module; one winding of the series transformer has two ends connected in series to a line, and the other winding thereof is sequentially connected to the current limiting (Continued)

module and the high-speed converter bypass device; the voltage source converter and the high-speed converter bypass device are connected in parallel; and at least one winding of the series transformer are connected in parallel to at least one series transformer bypass device. The series compensator of the present invention indirectly provides the current limiting module, so as to effectively limit the short-circuit current of a system, reduce the fault current to which the compensator is subjected, and improve the reliability of an alternating current system and the series compensator. Moreover, the current limiting module has a low voltage level, and the high-speed switch has a small breaking current, thereby providing good industrial applicability.

16 Claims, 4 Drawing Sheets

(51) Int. Cl.
| | |
|---|---|
| *H01H 71/24* | (2006.01) |
| *G05B 15/02* | (2006.01) |
| *H02J 3/00* | (2006.01) |
| *H02J 13/00* | (2006.01) |
| *H01H 33/66* | (2006.01) |
| *H01H 79/00* | (2006.01) |

(52) U.S. Cl.
CPC .............. *H01H 33/66* (2013.01); *H01H 79/00* (2013.01); *H02J 3/00* (2013.01); *H02J 13/00* (2013.01)

(58) Field of Classification Search
CPC .......... H01H 9/54; H01H 89/00; H01H 71/24; H01H 33/66; H01H 33/596; H01F 38/40
USPC ..................................... 361/2–13, 35, 62–69
See application file for complete search history.

(56) References Cited

U.S. PATENT DOCUMENTS

| | | | | |
|---|---|---|---|---|
| 5,883,774 | A * | 3/1999 | Kida ........................ | H02H 9/08 |
| | | | | 361/58 |
| 6,633,092 | B2 * | 10/2003 | Dahler .................. | H02J 3/1814 |
| | | | | 307/100 |
| 2017/0199502 | A1 * | 7/2017 | Tian ...................... | H02J 3/1814 |

OTHER PUBLICATIONS

Written Opinion dated Nov. 29, 2018 from corresponding application No. PCT/CN2018/104949.

* cited by examiner

SERIES COMPENSATOR AND CONTROL METHOD

RELATED APPLICATIONS

The present application is a National Phase of International Application Number PCT/CN2018/104949, filed Sep. 11, 2018, and claims the priority of China Application No. 201711381798.9, filed Dec. 20, 2017.

TECHNICAL FIELD

The present invention relates to the field of power electronics, and in particular, to a series compensator having a fault current limiting function and a corresponding control method.

BACKGROUND

With the expansion of the capacity and scale of power systems, the level of the short-circuit fault current in the power systems has also continued to increase, and short-circuit faults have become increasingly destructive to the power systems and electrical devices connected thereto. On the other hand, with the interconnection of large-scale power systems and the use of various new devices, the scale and complexity of the power systems are increased while power generation and transmission become more economical and efficient. The continuous increase in user loads requires power flow control methods to improve existing power transmission capabilities. Complex power exchange between the booming smart grid and the electricity market requires frequent power flow control, and the requirements of the power systems for power flow control and short-circuit current limitation are increasing.

At present, in the scheme of limiting the short-circuit current of the systems, a fault current limiter is adopted to quickly change impedance parameters of a faulty line, limit the short-circuit current to a low level, so that the existing breakers cut off short-circuit faults without exceeding the interrupting capacity thereof. However, the disclosed fault current limiters include resonant fault current limiters, solid-state fault current limiters, and superconducting fault current limiters, etc., which are all directly installed on high-voltage lines. The fault current to which the current limiting device is subjected is relatively large, and the corresponding breaking switch or device of the current limiting device has a large current during breaking, thus affecting the reliability of the device. In the prior art, the use of a series compensator can optimize and regulate system power flow. However, the series compensator cannot control the current in the case of a system fault, and a serious fault would affect the safety of the series compensator device. Therefore, there is a need for a compensator that can optimize the system power flow and limit the short-circuit current of the systems more safely and reliably.

SUMMARY

An objective of the present invention is to provide a series compensator and a unified power flow controller that can optimize the system power flow distribution, and can reduce the system short-circuit current and improve system reliability, and are suitable for industrial applications, and provide a control method for a series compensator.

A solution of the present invention is as follows:

A series compensator, including: a series transformer, at least one series transformer bypass device, a voltage source converter, at least one high-speed converter bypass device, at least one high-speed switch, and at least one reactor, where the reactor and the high-speed switch are connected in parallel to form a current limiting module; one winding of the series transformer has two ends connected in series to a line, and the other winding thereof is sequentially connected to the current limiting module and the high-speed converter bypass device; the voltage source converter and the high-speed converter bypass device are connected in parallel; and at least one winding of the series transformer are connected in parallel to the at least one series transformer bypass device.

Furthermore, the series transformer is a single-phase transformer; two ends of a first winding of the series transformer are connected in series to a line; a first end of a second winding of the series transformer is connected to a first end of the current limiting module; a second end of the current limiting module is connected to a first end of the high-speed converter bypass device; a second end of the high-speed converter bypass device is connected to a second end of the second winding of the series transformer; and a first output end of the voltage source converter is connected to the first end of the high-speed converter bypass device, and a second output end of the voltage source converter is connected to the second end of the second winding of the series transformer.

Furthermore, the series transformer is a three-phase transformer; two ends of three phases of a first winding of the series transformer are connected in series to a three-phase alternating current line, respectively; a second winding of the series transformer is in a star connection; three phases of an output end of the second winding of the series transformer are connected to three phases of the first end of the current limiting module, respectively; three phases of the second end of the current limiting module are connected to three phases of the first end of the high-speed converter bypass device, respectively; three phases of the second end of the high-speed converter bypass device are connected to a neutral line of the second winding of the series transformer; and a three-phase alternating current output side of the voltage source converter is connected to three phases of the second end of the current limiting module.

Furthermore, the series transformer is a three-phase transformer; two ends of three phases of a first winding of the series transformer are connected in series to a three-phase alternating current line, respectively; a second winding of the series transformer is in a triangle connection; three-phase windings of the second winding of the series transformer are sequentially connected end-to-end to form a triangle structure and form a three-phase output end; a three-phase output end of the second winding of the series transformer is connected to three phases of the first end of the current limiting module, respectively; three phases of the second end of the current limiting module are connected to three phases of an alternating current output end of the voltage source converter, respectively; three-phase devices of the high-speed converter bypass device are sequentially connected end-to-end to form a triangle structure and form a three-phase output end; and the three-phase output end of the high-speed converter bypass device is connected to three phases of the alternating current output end of the voltage source converter, respectively.

Furthermore, the current limiting module further includes at least one capacitor; the capacitor is connected in parallel to the reactor to form an impedance unit; and the impedance unit is connected in parallel to the high-speed switch to form a current limiting module.

Furthermore, one end of the first winding of the series transformer is connected to one end of the series transformer bypass device by means of a breaker, and the other end thereof is connected to the other end of the series transformer bypass device by means of an isolating switch; or two ends of a winding of the series transformer connected to the line are connected to two ends of the series transformer bypass device by means of a breaker, respectively.

Furthermore, at least one winding of the series transformer are connected in parallel to at least one overvoltage protection device; and two ends of the high-speed converter bypass device are connected in parallel to at least one overvoltage protection device.

Furthermore, the overvoltage protection device includes an arrester and a gap.

Furthermore, the series transformer bypass device is a mechanical bypass switch, or is a bypass switch composed of power electronic devices; the high-speed converter bypass device is a high-speed mechanical bypass switch, or a high-speed bypass switch composed of power electronic devices; and the high-speed switch is a mechanical switch, or a switch composed of power electronic devices.

Furthermore, when the series transformer is a three-phase transformer, and the second winding of the series transformer is in a star connection, the series transformer includes a third winding; a winding of one phase of the third winding is connected in series to one reactor, and then is sequentially connected to windings of the other two phases end-to-end to form a triangle structure and form a three-phase output end.

Furthermore, when the series transformer is a three-phase transformer, and the second winding of the series transformer is in a star connection, the neutral line of the second winding of the series transformer is directly grounded, or is electrically grounded by means of a resistor, or is grounded by means of a reactor.

Another solution of the present invention is as follows:

A series compensator, including: a series transformer, at least one series transformer bypass device, a voltage source converter, at least one high-speed converter bypass device, N high-speed switches, and N reactors, where N is a natural number, and N is greater than 1; the N reactors are connected in parallel to the N high-speed switches, respectively; each reactor is connected in parallel to one high-speed switch to form one current limiting module, and a total of N current limiting modules are formed; the N current limiting modules are sequentially connected in series to form one current limiting module group; one winding of the series transformer has two ends connected in series to a line, and the other winding thereof is sequentially connected to the current limiting module group and the high-speed converter bypass device; the voltage source converter and the high-speed converter bypass device are connected in parallel; and at least one winding of the series transformer are connected in parallel to the at least one series transformer bypass device.

Furthermore, the series compensator further includes N capacitors, where the N reactors are connected in parallel to the N capacitors, respectively; each reactor is connected in parallel to one capacitor to form one impedance unit, and a total of N impedance units are formed; the N impedance units are connected in parallel to the N high-speed switches, respectively; and each impedance unit is connected in parallel to one high-speed switch to form one current limiting module, and a total of N current limiting modules are formed.

The present invention also provides a unified power flow controller, including a series part and a parallel part, where the series part of the unified power flow controller includes a series transformer, at least one series transformer bypass device, a voltage source converter, at least one high-speed converter bypass device, at least one high-speed switch, and at least one reactor; the reactor and the high-speed switch are connected in parallel to form a current limiting module; one winding of the series transformer has two ends connected in series to a line, and the other winding thereof is sequentially connected to the current limiting module and the high-speed converter bypass device; the voltage source converter and the high-speed converter bypass device are connected in parallel; at least one winding of the series transformer are connected in parallel to the at least one series transformer bypass device;

the parallel part of the unified power flow controller includes a parallel transformer, a voltage source converter, a starting circuit, and an alternating current breaker; the starting circuit is composed of a resistor and an isolating switch connected in parallel, or composed of a resistor and a breaker connected in parallel; and the parallel part and the series part of the unified power flow controller are connected to each other by means of a direct current side of the voltage source converter.

The present invention provides a control method for a series compensator, where the series compensator includes a series transformer, at least one series transformer bypass device, a voltage source converter, at least one high-speed converter bypass device, at least one high-speed switch, and at least one reactor;

the reactor and the high-speed switch are connected in parallel to form a current limiting module;

one winding of the series transformer has two ends connected in series to a line, and the other winding thereof is sequentially connected to the current limiting module and the high-speed converter bypass device; the voltage source converter and the high-speed converter bypass device are connected in parallel; at least one winding of the series transformer are connected in parallel to the at least one series transformer bypass device;

the control method for a series compensator includes: when an alternating current system is operating normally, keeping the high-speed switch connected in parallel to the reactor in a closed state, the series transformer bypass device in an OFF state, the high-speed converter bypass device in an OFF state, and the voltage source converter in a deblocked state, and switching on the series compensator for operation in the alternating current system;

after determining that a serious fault occurs at a near end of a line, first blocking the voltage source converter and switching on the high-speed converter bypass device, and then opening the high-speed switch connected in parallel to the reactor to limit a line fault current; and after determining that the line fault is cleared, switching on the series transformer bypass device, and closing the high-speed switch connected in parallel to the reactor.

Furthermore, the determining that a serious fault occurs at a near end of a line specifically means detecting that the value of the current flowing through a line to which the series compensator is connected is greater than a preset current threshold and the duration is greater than a preset time; and the determining that the line fault is cleared specifically means detecting that the value of the current flowing through the line to which the series compensator is connected is less than the preset current threshold and the duration is greater than the preset time.

The present invention provides another control method for a series compensator, where the series compensator includes a series transformer, at least one series transformer bypass device, a voltage source converter, at least one high-speed converter bypass device, N high-speed switches, and N reactors, where N is a natural number, and N is greater than 1;

the N reactors are connected in parallel to the N high-speed switches, respectively; each reactor is connected in parallel to one high-speed switch to form one current limiting module, and a total of N current limiting modules are formed; the N current limiting modules are sequentially connected in series to form one current limiting module group; one winding of the series transformer has two ends connected in series to a line, and the other winding thereof is sequentially connected to the current limiting module group and the high-speed converter bypass device; the voltage source converter and the high-speed converter bypass device are connected in parallel; at least one winding of the series transformer are connected in parallel to the at least one series transformer bypass device;

the control method for a series compensator includes: when an alternating current system is operating normally, switching on and off the current limiting module according to a first specified rule; keeping the series transformer bypass device in an OFF state, the high-speed converter bypass device in an OFF state, and the voltage source converter in a deblocked state, and switching on the series compensator for operation in the alternating current system; and after determining that a serious fault occurs on a line or a near end of the line, first blocking the voltage source converter and switching on the high-speed converter bypass device, and then switching on the current limiting module according to a second specified rule to limit a line fault current.

Furthermore, the first specified rule is to calculate the number of the current limiting modules into the line required by the series compensator according to the requirements for system power flow optimization; and the second specified rule is to set m preset current thresholds, and if it is detected that the value of the current flowing through a line to which the series compensator is connected is greater than the m-th preset current threshold and the duration is greater than the m-th preset time, then opening the high-speed switches of m current limiting modules in the current limiting module group, where m is a natural number, and m is less than or equal to N.

After the foregoing scheme is adopted, when the alternating current system is normal, the present invention can optimize the power flow of the alternating current system by controlling the series converter. When a fault occurs in the alternating current system, on the one hand, the converter is isolated from the fault by means of the high-speed bypass switch of the converter; on the other hand, the fault current of the alternating current system can be limited by means of the high-speed switch-on of the current limiting module to protect the safe operation of the alternating current system and the safety of the series transformer, thus avoiding high voltage and large current to which the existing fault current limiting device installed in the high-voltage level system is subjected, thereby improving the reliability and economics of the device. When multiple current limiting modules are connected in series, different levels of current limiting can be performed according to the severity of a system fault. Moreover, when a fault occurs in some of the current limiting modules, the operation of other faulty modules is not affected, and thus the utilization and reliability of the fault current limiting modules are further improved. In addition, during steady-state operation, only some of the current limiting modules are switched on, and the power flow of the system is optimized with the control of the series converter, and the economic benefits are more obvious.

Figure 1:
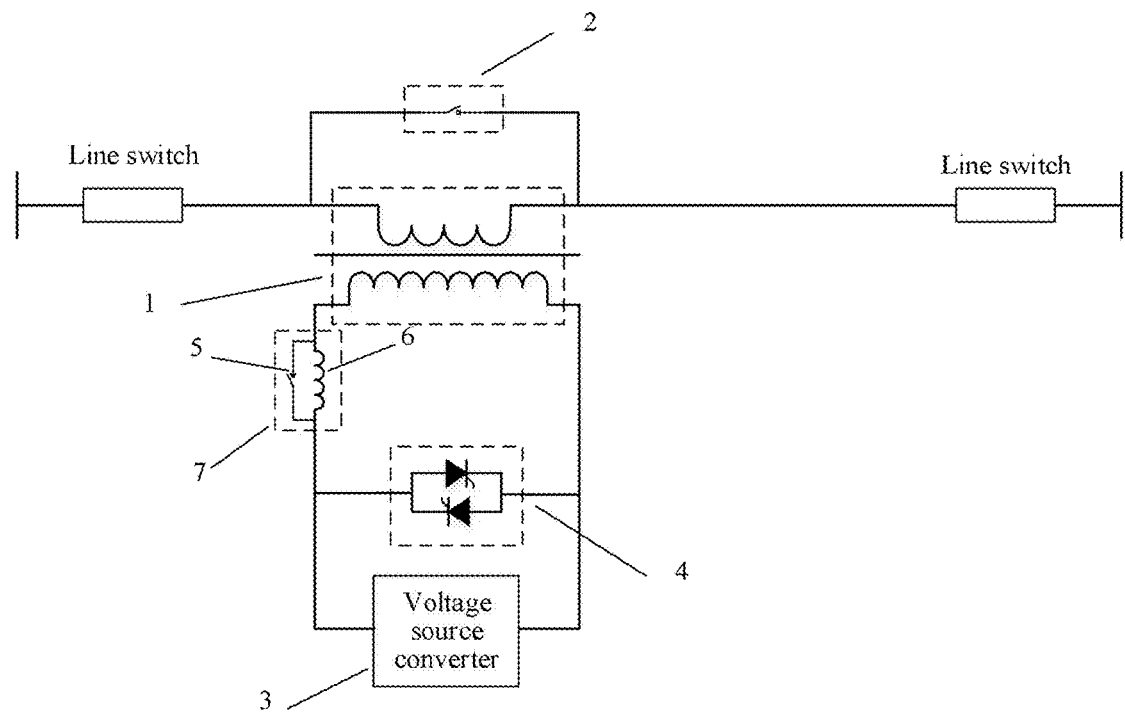
FIG. 1 is a series compensator having a fault current limiting function according to a first embodiment of the present invention.

In the drawings: 1—series transformer, 2—series transformer bypass device, 3—voltage source converter, 4—high-speed converter bypass device, 5—high-speed switch, 6—reactor, 7—current limiting module, 8—capacitor, 9—overvoltage protection device, 10—overvoltage protection device, 11—current limiting module group, 12—voltage source converter, 13—parallel transformer, 14—alternating current breaker, 15—starting circuit, 16—resistor 17—isolating switch, 18—transformer neutral line grounding resistor, 19—overvoltage protection device, 20—reactor.

DETAILED DESCRIPTION

The detailed embodiments of the present invention are described in detail below with reference to the accompanying drawings.

In the prior art, the use of a series compensator can optimize and regulate system power flow. However, the series compensator cannot control the current in the case of a system fault, and a serious fault would affect the safety of the series compensator device. In addition, the existing fault current limiters are all directly installed on high-voltage lines. The fault current to which the current limiting device is subjected is relatively large, and the corresponding breaking switch or device of the current limiting device has a large current during breaking, thus affecting the reliability of the device. The present invention provides a series compensator having a fault current limiting function. A preferred embodiment is shown in FIG. 1. The series compensator having a fault current limiting function includes a series transformer 1, a series transformer bypass device 2, a voltage source converter 3, a high-speed converter bypass device 4, a high-speed switch 5, and a reactor 6.

The series transformer 1 is a single-phase transformer; the reactor 6 is connected in parallel to the high-speed switch 5 to form a current limiting module 7; two ends of a first winding of the series transformer 1 are connected in series to a line; a first end of a second winding of the series transformer 1 is connected to a first end of the current limiting module 7; a second end of the current limiting module 7 is connected to a first end of the high-speed converter bypass device 4; a second end of the high-speed converter bypass device 4 is connected to a second end of the second winding of the series transformer 1; a first output end of the voltage source converter 3 is connected to the second end of the current limiting module 7 and the first end of the high-speed converter bypass device 4; a second output end of the voltage source converter 3 is connected to the second end of the second winding of the series transformer; and two ends of the first winding of the series transformer 1 are connected in parallel to one series transformer bypass device 2.

Figure 2:
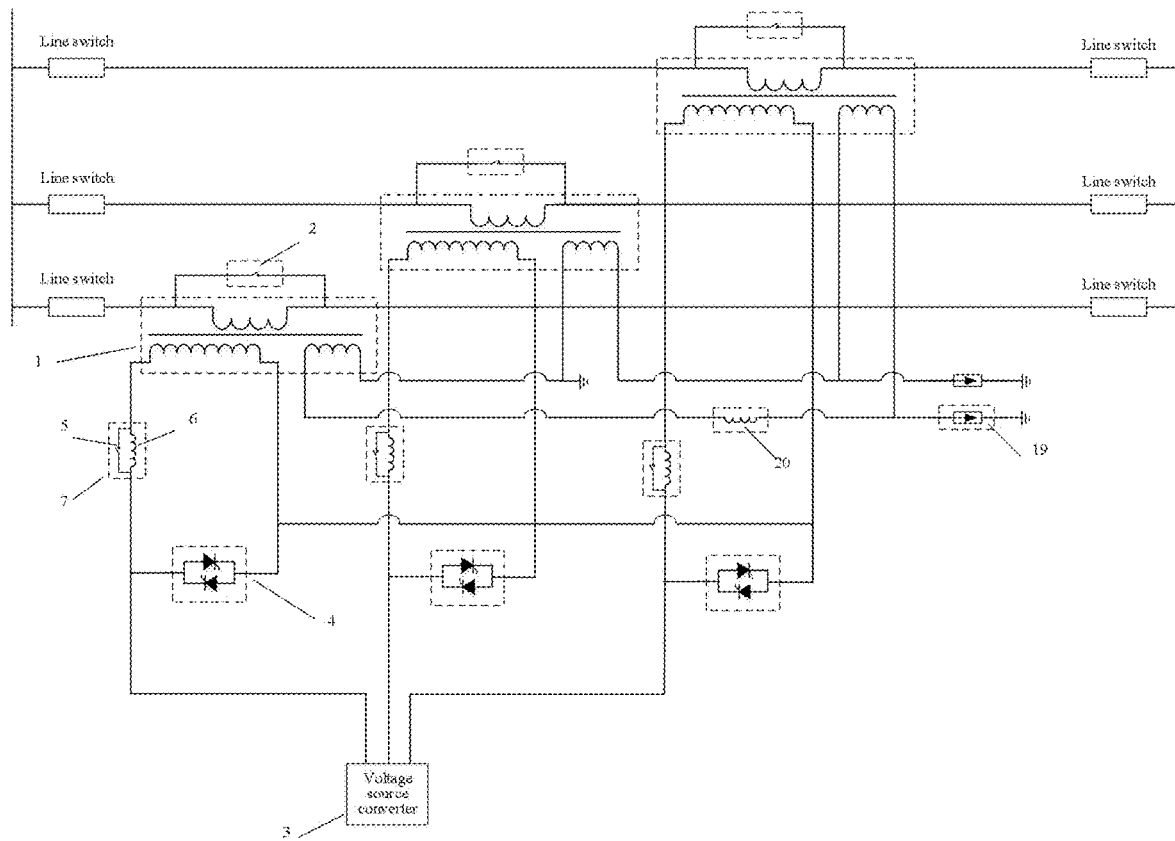
FIG. 2 is a series compensator having a fault current limiting function according to a second embodiment of the present invention.

A second preferred embodiment of the series compensator having a fault current limiting function provided by the present invention is as shown in FIG. 2. The series transformer 1 is a three-phase transformer; two ends of three phases of a first winding of the series transformer 1 are connected in series to a three-phase alternating current line, respectively; two ends of the first winding of the series transformer 1 are connected in parallel to one series transformer bypass device 2; the reactor 6 and the high-speed switch 5 are connected in parallel to form a current limiting module 7; a second winding of the series transformer 1 is in a star connection; three phases of an output end of the second winding of the series transformer 1 are connected to three phases of the first end of the current limiting module 7, respectively; three phases of the second end of the current limiting module 7 are connected to three phases of the first end of the high-speed converter bypass device 4, respectively; three phases of the second end of the high-speed converter bypass device 4 are connected to a neutral line of the second winding of the series transformer 1; and a three-phase alternating current output side of the voltage source converter 3 is connected to three phases of the second end of the current limiting module 7.

The series transformer 1 further includes a third winding; a winding of one phase of the third winding is connected in series to one reactor 20, and then is sequentially connected to windings of the other two phases end-to-end to form a triangle structure and form a three-phase output end; one end of the three-phase output ends is directly grounded, and the other two ends are connected to the overvoltage protection device 19 and then are grounded; and the overvoltage protection device includes a arrester and a gap.

The neutral line of the second winding of the series transformer 1 is directly grounded, or is electrically grounded by means of a resistor, or is grounded by means of a reactor.

Figure 3:
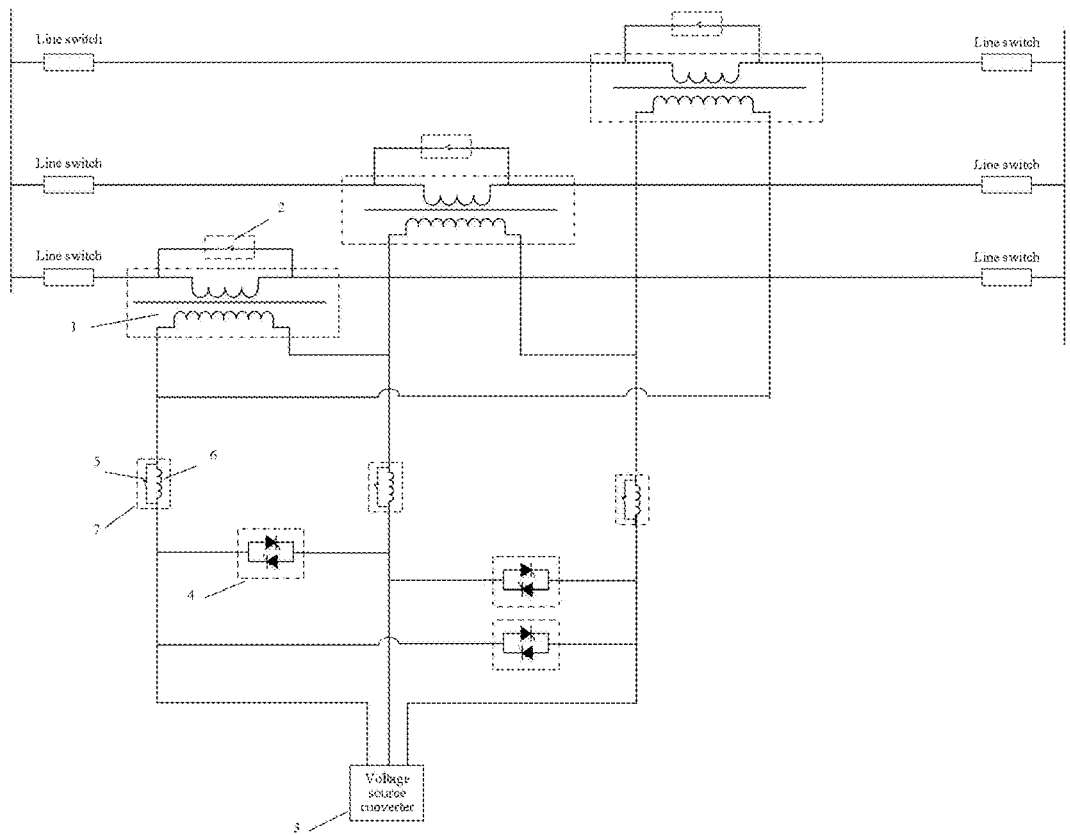
FIG. 3 is a series compensator having a fault current limiting function according to a third embodiment of the present invention.

FIG. 3 shows a third preferred embodiment of the series compensator having a fault current limiting function provided by the present invention. The series transformer 1 is a three-phase transformer; two ends of three phases of a first winding of the series transformer 1 are connected in series to a three-phase alternating current line, respectively; two ends of the first winding of the series transformer 1 are connected in parallel to one series transformer bypass device 2; the reactor 6 and the high-speed switch 5 are connected in parallel to form a current limiting module 7; a second winding of the series transformer 1 is in an triangle connection; three-phase windings of the second winding of the series transformer 1 are sequentially connected end-to-end to form a triangle structure and form a three-phase output end; a three-phase output end of the second winding of the series transformer 1 is connected to three phases of the first end of the current limiting module 7, respectively; three phases of the second end of the current limiting module 7 are connected to three phases of an alternating current output end of the voltage source converter 3, respectively; three-phase devices of the high-speed converter bypass device 4 are sequentially connected end-to-end to form a triangle structure and form a three-phase output end; the three-phase output end of the high-speed converter bypass device 4 is connected to three phases of the alternating current output end of the voltage source converter 3, respectively.

Figure 4:
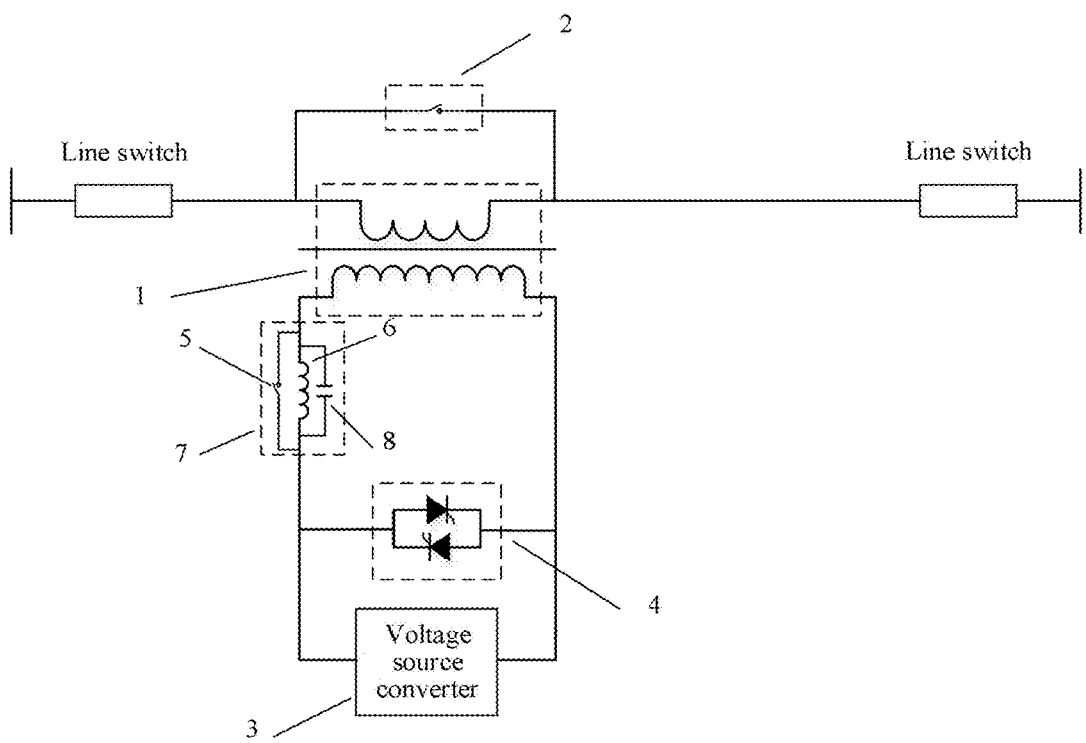
FIG. 4 is a series compensator having a fault current limiting function according to a fourth embodiment of the present invention.

FIG. 4 shows a fourth preferred embodiment of the series compensator having a fault current limiting function provided by the present invention. The current limiting module 7 further includes at least one capacitor 8; the capacitor 8 is connected in parallel to the reactor 6 to form an impedance unit, and the impedance unit is connected in parallel to the high-speed switch 5 to form a current limiting module 7.

Figure 5:
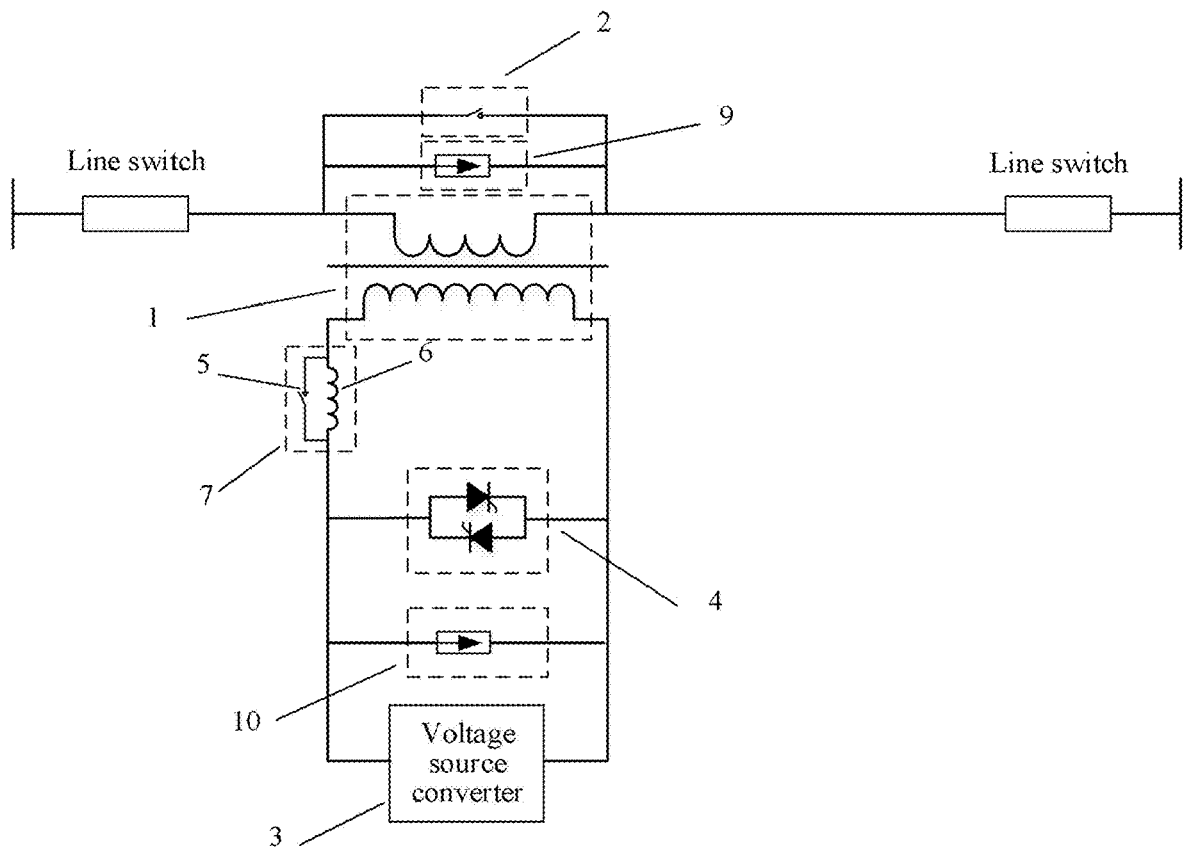
FIG. 5 is a series compensator having a fault current limiting function according to a fifth embodiment of the present invention.

FIG. 5 shows a fifth preferred embodiment of the series compensator having a fault current limiting function provided by the present invention. The first winding of the series transformer 1 is connected in parallel to one overvoltage protection device 9, and two ends of the high-speed converter bypass device 4 are connected in parallel to one overvoltage protection device 10; and the overvoltage protection device 9 and the overvoltage protection device 10 include an arrester and a gap.

In all the foregoing embodiments, the series transformer bypass device 2 is a mechanical bypass switch, or is a bypass switch composed of power electronic devices; the high-speed converter bypass device 4 is a high-speed mechanical bypass switch, or a high-speed bypass switch composed of power electronic devices; and the high-speed switch 5 is a mechanical switch, or a switch composed of power electronic devices.

In all the foregoing embodiments, one end of the first winding of the series transformer 1 is connected to one end of the series transformer bypass device by means of a breaker, and the other end thereof is connected to the other end of the series transformer bypass device by means of an isolating switch; or two ends of a winding of the series transformer connected to the line are connected to two ends of the series transformer bypass device by means of a breaker, respectively.

A corresponding control method for the series compensator having a fault current limiting function shown in the foregoing embodiments 1 to 5 includes:

when an alternating current system is operating normally, keeping the high-speed switch 5 connected in parallel to the reactor 6 in a closed state, the series transformer bypass device 2 in an OFF state, the high-speed converter bypass device 4 in an OFF state, and the voltage source converter 3 in a deblocked state, and switching on the series compensator for operation in the alternating current system; after determining that a serious fault occurs at a near end of a line to which the compensator is connected, first blocking the voltage source converter 3 and switching on the high-speed converter bypass device 4, and then opening the high-speed switch 5 to limit a line fault current; and after determining that the line fault is cleared, switching on the series transformer bypass device 2, and closing the high-speed switch 5.

The method for determining that a serious fault occurs at a near end of a line includes: detecting that the value of the current flowing through a line to which the series compensator is connected is greater than a preset current threshold and the duration is greater than a preset time. The method for determining that the line fault is cleared includes: detecting that the value of the current flowing through a line to which the series compensator is connected is less than a preset current threshold and the duration is greater than the preset time.

Figure 6:
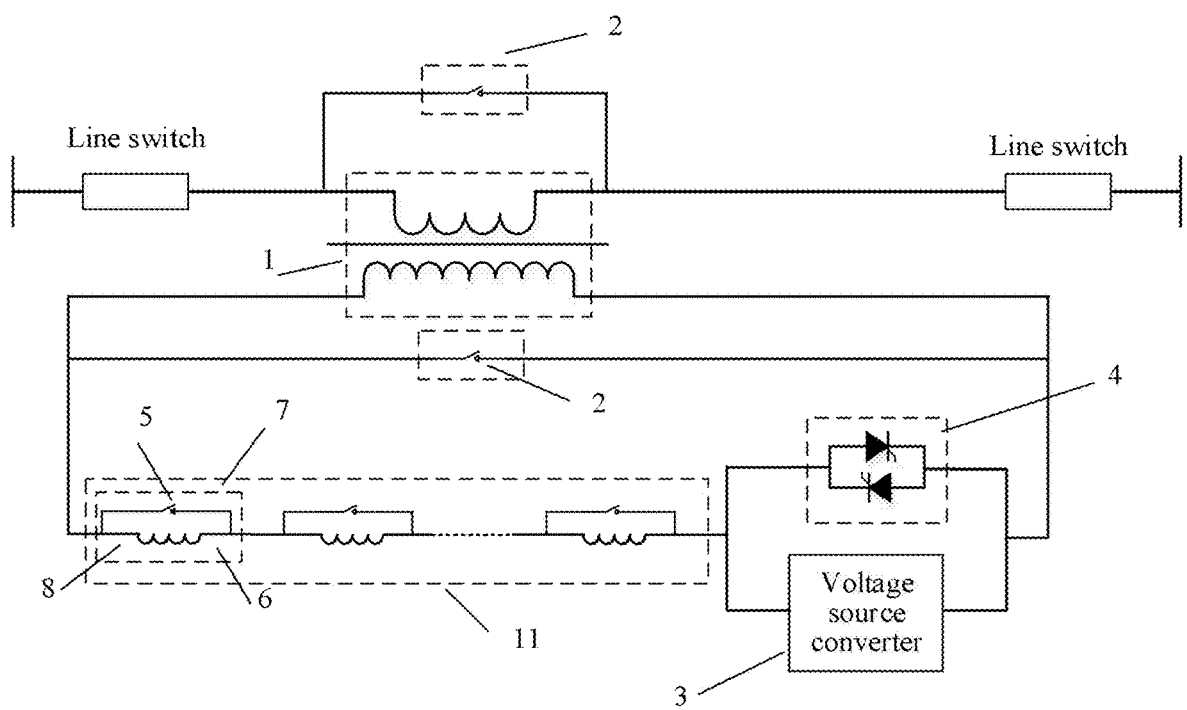
FIG. 6 is a series compensator having a fault current limiting function according to a sixth embodiment of the present invention.

FIG. 6 shows a sixth preferred embodiment of the series compensator having a fault current limiting function provided by the present invention. The series compensator includes a series transformer 1, two series transformer bypass devices 2, a voltage source converter 3, a high-speed converter bypass device 4, N high-speed switches 5, and N reactors 6, where N is a natural number, and N is greater than 1.

The N reactors 6 are connected in parallel to the N high-speed switches 5, respectively; each reactor 6 is connected in parallel to one high-speed switch 5 to form one current limiting module 7, and a total of N current limiting modules 7 are formed; the N current limiting modules 7 are sequentially connected in series to form one current limiting module group 11.

Two ends of the first winding of the series transformer 1 are connected in series to a line; a first end of the second winding is connected to a first end of the current limiting module group 11; a second end of the current limiting module group is connected to a first end of the high-speed converter bypass device 4; a second end of the high-speed converter bypass device 4 is connected to a second end of the second winding of the series transformer 1; an output end of the voltage source converter 3 is connected to a second end of the current limiting module group 11 and the first end of the high-speed converter bypass device 4.

Two ends of two windings of the series transformer 1 are connected in parallel to one series transformer bypass device 2, respectively.

A control method for the series compensator having a fault current limiting function shown in FIG. 6 includes:

when an alternating current system is operating normally, switching on and off the current limiting module 7 according to a first specified rule; keeping the series transformer bypass device 2 in an OFF state, the high-speed converter bypass device 4 in an OFF state, and the voltage source converter 3 in a deblocked state, and switching on the series compensator for operation in the alternating current system; and after determining that a serious fault occurs on a near end of the line, first blocking the voltage source converter 3 and switching on the high-speed converter bypass device 4, and then switching on the current limiting module 7 according to a second specified rule to limit line fault current.

The first specified rule is to calculate the number of the current limiting modules 7 in the line required by the series compensator according to the requirements for system power flow optimization. The second specified rule is to set m preset current thresholds, and if it is detected that the value of the current flowing through a line to which the series compensator is connected is greater than the m-th preset current threshold and the duration is greater than the m-th preset time, then opening the high-speed switches 5 of m current limiting modules 7 in the current limiting module group 11, where m is a natural number, and m is less than or equal to N.

Figure 7:
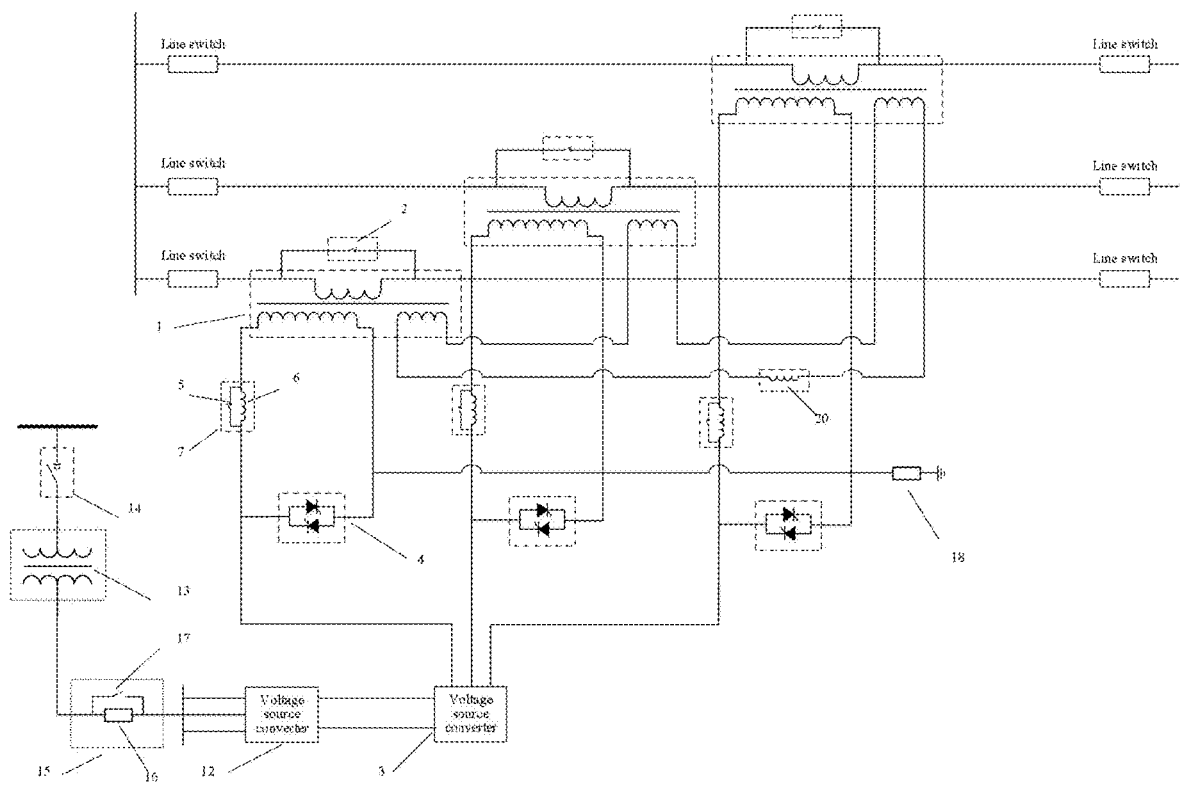
FIG. 7 is a unified power flow controller having a fault current limiting function according to one embodiment of the present invention.

FIG. 7 shows a preferred embodiment of the unified power flow controller provided by the present invention. A series part of the unified power flow controller has the same structure as the series compensator having a fault current limiting function. The unified power flow controller includes a series part and a parallel part. The series part includes a series transformer 1, a series transformer bypass device 2, a voltage source converter 3, a high-speed converter bypass device 4, a high-speed switch 5, a reactor 6, and a transformer neutral line grounding resistor 18; the parallel part includes a voltage source converter 12, a parallel transformer 13, an alternating current breaker 14, a resistor 16, and an isolating switch 17.

The series transformer 1 is a three-phase transformer; two ends of three phases of a first winding of the series transformer 1 are connected in series to a three-phase alternating current line, respectively; two ends of the first winding of the series transformer 1 are connected in parallel to one series transformer bypass device 2; the reactor 6 and the high-speed switch 5 are connected in parallel to form a current limiting module 7; a second winding of the series transformer 1 is in a star connection; three phases of an output end of the second winding of the series transformer 1 are connected to three phases of the first end of the current limiting module 7, respectively; three phases of the second end of the current limiting module 7 are connected to three phases of the first end of the high-speed converter bypass device 4, respectively; three phases of the second end of the high-speed converter bypass device 4 are connected to a neutral line of the second winding of the series transformer 1; the neutral line of the second winding of the series transformer 1 is grounded by means of the transformer grounding resistor 18; the three-phase alternating current output side of the voltage source converter 3 is connected to three phases of the second end of the current limiting module 7; the series transformer 1 further includes a third winding; and a winding of one phase of the third winding is connected in series to one reactor 20, and then is sequentially connected to windings of the other two phases end-to-end to form a triangle structure and form a three-phase output end.

A direct current output side of the voltage source converter 3 is connected in parallel to a direct current output side of the voltage source converter 12; the resistor 16 and the isolating switch 17 are connected in parallel to form a starting circuit 15; the three-phase alternating current output side of the voltage source converter 12 is connected to three phases of a first end of the starting circuit 15; a second end of the starting circuit 15 is connected to a first end of the parallel transformer 13; a second end of the parallel transformer 13 is connected to a first end of the alternating current breaker 14; a second end of the alternating current breaker 14 is connected to an alternating current bus.

It should be noted that elements, such as reactors, resistors, and switches, in the present invention, are mostly equivalent elements. That is, the equivalent elements in the circuit structure may be individual elements or formed by cascading (series, parallel, etc.) multiple same elements. For any equivalent element in the embodiments of the present invention, any equivalent circuit capable of achieving the same function should fall within the scope of protection of the embodiments of the present invention. In addition, the connection among the elements in the embodiments of the present invention is the most basic connection. In practice, connection methods commonly used in power systems and conventional connection devices may be used for connection.

Finally, it should be explained that the foregoing embodiments merely describe the technical solutions of the present invention, instead of limiting the technical solutions of the present invention. A person of ordinary skill in the art should understand that a person skilled in the art can perform modification or equivalent substitution on the specific embodiments of the present invention. However, these modifications or changes are all within the scope of protection of the pending patent application.

The invention claimed is:

1. A series compensator, comprising:
a series transformer, at least one series transformer bypass device, a voltage source converter, at least one high-speed converter bypass device, at least one high-speed switch, and at least one reactor, wherein
the reactor and the high-speed switch are connected in parallel to form a current limiting module;
one winding of the series transformer has two ends connected in series to a line, and the other winding thereof is sequentially connected to the current limiting module and the high-speed converter bypass device; the voltage source converter and the high-speed converter bypass device are connected in parallel; and at least one winding of the series transformer are connected in parallel to the at least one series transformer bypass device; and
the current limiting module further comprises at least one capacitor, the capacitor is connected in parallel to the reactor to form an impedance unit; and the impedance unit is connected in parallel to the high-speed switch to form a current limiting module;
wherein at least one winding of the series transformer are connected in parallel to at least one overvoltage protection device; and two ends of the high-speed converter bypass device are connected in parallel to at least one overvoltage protection device.

2. The series compensator according to claim 1, wherein the series transformer is a single-phase transformer; two ends of a first winding of the series transformer are connected in series to a line; a first end of a second winding of the series transformer is connected to a first end of the current limiting module; a second end of the current limiting module is connected to a first end of the high-speed converter bypass device; a second end of the high-speed converter bypass device is connected to a second end of the second winding of the series transformer; and a first output end of the voltage source converter is connected to the first end of the high-speed converter bypass device, and a second output end of the voltage source converter is connected to the second end of the second winding of the series transformer.

3. The series compensator according to claim 1, wherein the series transformer is a three-phase transformer; two ends of three phases of a first winding of the series transformer are connected in series to a three-phase alternating current line, respectively; a second winding of the series transformer is in a star connection; three phases of an output end of the second winding of the series transformer are connected to three phases of the first end of the current limiting module, respectively; three phases of the second end of the current limiting module are connected to three phases of the first end of the high-speed converter bypass device, respectively; three phases of the second end of the high-speed converter bypass device are connected to a neutral line of the second winding of the series transformer; and a three-phase alternating current output side of the voltage source converter is connected to three phases of the second end of the current limiting module.

4. The series compensator according to claim 1, wherein the series transformer is a three-phase transformer; two ends of three phases of a first winding of the series transformer are connected in series to a three-phase alternating current line, respectively; a second winding of the series transformer is in a triangle connection; three-phase windings of the second winding of the series transformer are sequentially connected end-to-end to form a triangle structure and form a three-phase output end; a three-phase output end of the second winding of the series transformer is connected to three phases of the first end of the current limiting module, respectively; three phases of the second end of the current limiting module are connected to three phases of an alternating current output end of the voltage source converter, respectively; three-phase devices of the high-speed converter bypass device are sequentially connected end-to-end to form a triangle structure and form a three-phase output end; and the three-phase output end of the high-speed converter bypass device is connected to three phases of the alternating current output end of the voltage source converter, respectively.

5. The series compensator according to claim 1, wherein a first end of the first winding of the series transformer is connected to a first end of the series transformer bypass device by means of a breaker, and a second end of the first winding of the series transformer is connected to a second end of the series transformer bypass device by means of an isolating switch; or two ends of a winding of the series transformer connected to the line are connected to two ends of the series transformer bypass device by means of a breaker, respectively.

6. The series compensator according to claim 1, wherein the overvoltage protection device comprises an arrester and a gap.

7. The series compensator according to claim 1, wherein the series transformer bypass device is a mechanical bypass switch, or is a bypass switch composed of power electronic devices; the high-speed converter bypass device is a high-speed mechanical bypass switch, or a high-speed bypass switch composed of power electronic devices; and the high-speed switch is a mechanical switch, or a switch composed of power electronic devices.

8. The series compensator according to claim 3, wherein the series transformer comprises a third winding; a winding of one phase of the third winding is connected in series to one reactor, and then is sequentially connected to windings of the other two phases end-to-end to form a triangle structure and form a three-phase output end.

9. The series compensator according to claim 3, wherein the neutral line of the second winding of the series transformer is directly grounded, or is electrically grounded by means of a resistor, or is grounded by means of a reactor.

10. A control method for the series compensator according to claim 1, wherein
the series compensator comprises a series transformer, at least one series transformer bypass device, a voltage source converter, at least one high-speed converter bypass device, at least one high-speed switch, and at least one reactor;
the reactor and the high-speed switch are connected in parallel to form a current limiting module;

one winding of the series transformer has two ends connected in series to a line, and the other winding thereof is sequentially connected to the current limiting module and the high-speed converter bypass device; the voltage source converter and the high-speed converter bypass device are connected in parallel; at least one winding of the series transformer are connected in parallel to the at least one series transformer bypass device;

the control method for the series compensator comprises:
when an alternating current system is operating normally, keeping the high-speed switch connected in parallel to the reactor in a closed state, the series transformer bypass device in an OFF state, the high-speed converter bypass device in an OFF state, and the voltage source converter in a deblocked state, and switching on the series compensator for operation in the alternating current system; and after determining that a serious fault occurs at a near end of a line, first blocking the voltage source converter and switching on the high-speed converter bypass device, and then opening the high-speed switch connected in parallel to the reactor to limit a line fault current; and after determining that the line fault is cleared, switching on the series transformer bypass device, and closing the high-speed switch connected in parallel to the reactor.

11. The control method for the series compensator according to claim 10, wherein
the determining that a serious fault occurs at a near end of a line specifically means detecting that the value of the current flowing through a line to which the series compensator is connected is greater than a preset current threshold and the duration is greater than a preset time; and
the determining that the line fault is cleared specifically means detecting that the value of the current flowing through the line to which the series compensator is connected is less than the preset current threshold and the duration is greater than the preset time.

12. A series compensator, comprising:
a series transformer, at least one series transformer bypass device, a voltage source converter, at least one high-speed converter bypass device, N high-speed switches, and N reactors, wherein N is a natural number, and N is greater than 1;
the N reactors are connected in parallel to the N high-speed switches, respectively; each reactor is connected in parallel to one high-speed switch to form one current limiting module, and a total of N current limiting modules are formed; the N current limiting modules are sequentially connected in series to form one current limiting module group; and
one winding of the series transformer has two ends connected in series to a line, and the other winding thereof is sequentially connected to the current limiting module group and the high-speed converter bypass device; the voltage source converter and the high-speed converter bypass device are connected in parallel; and
at least one winding of the series transformer are connected in parallel to the at least one series transformer bypass device.

13. The series compensator according to claim 12, further comprising N capacitors, wherein the N reactors are connected in parallel to the N capacitors, respectively; each reactor is connected in parallel to one capacitor to form one impedance unit, and a total of N impedance units are formed; the N impedance units are connected in parallel to the N high-speed switches, respectively; and each impedance unit is connected in parallel to one high-speed switch to form one current limiting module, and a total of N current limiting modules are formed.

14. A control method for the series compensator according to claim 12, wherein
the series compensator comprises a series transformer, at least one series transformer bypass device, a voltage source converter, at least one high-speed converter bypass device, N high-speed switches, and N reactors, wherein N is a natural number, and N is greater than 1;
the N reactors are connected in parallel to the N high-speed switches, respectively; each reactor is connected in parallel to one high-speed switch to form one current limiting module, and a total of N current limiting modules are formed; the N current limiting modules are sequentially connected in series to form one current limiting module group; one winding of the series transformer has two ends connected in series to a line, and the other winding thereof is sequentially connected to the current limiting module group and the high-speed converter bypass device; the voltage source converter and the high-speed converter bypass device are connected in parallel; at least one winding of the series transformer are connected in parallel to the at least one series transformer bypass device; and the control method for the series compensator comprises:
when an alternating current system is operating normally, switching on and off the current limiting module according to a first specified rule; keeping the series transformer bypass device in an OFF state, the high-speed converter bypass device in an OFF state, and the voltage source converter in a deblocked state, and switching on the series compensator for operation in the alternating current system; and after determining that a serious fault occurs on a line or a near end of the line, first blocking the voltage source converter and switching on the high-speed converter bypass device, and then switching on the current limiting module according to a second specified rule to limit the line fault current.

15. The control method for the series compensator according to claim 14, wherein
the first specified rule is to calculate the number of the current limiting modules into the line required by the series compensator according to the requirements for system power flow optimization; and
the second specified rule is to set m preset current thresholds, and if it is detected that the value of the current flowing through a line to which the series compensator is connected is greater than the m-th preset current threshold and the duration is greater than the m-th preset time, then opening the high-speed switches of m current limiting modules in the current limiting module group, wherein m is a natural number, and m is less than or equal to N.

16. A unified power flow controller, comprising:
a series part and a parallel part, wherein
the series part of the unified power flow controller comprises a series transformer, at least one series transformer bypass device, a voltage source converter, at least one high-speed converter bypass device, at least one high-speed switch, and at least one reactor; the reactor and the high-speed switch are connected in parallel to form a current limiting module; one winding of the series transformer has two ends connected in series to a line, and the other winding thereof is sequentially connected to the current limiting module and the high-speed converter bypass device; the voltage source converter and the high-speed converter bypass device are connected in parallel; at least one winding of the series transformer are connected in parallel to the at least one series transformer bypass device;

the parallel part of the unified power flow controller comprises a parallel transformer, a voltage source converter, a starting circuit, and an alternating current breaker; the starting circuit is composed of a resistor and an isolating switch connected in parallel, or composed of a resistor and a breaker connected in parallel; and the parallel part and the series part of the unified power flow controller are connected to each other by means of a direct current side of the voltage source converter.

\* \* \* \* \*